(12) United States Patent
Nakano et al.

(10) Patent No.: US 8,654,173 B2
(45) Date of Patent: Feb. 18, 2014

(54) OPTICAL SCANNING APPARATUS AND IMAGE FORMING APPARATUS

(75) Inventors: Issei Nakano, Osaka (JP); Nobuhiro Fukuma, Osaka (JP); Jun Nakai, Osaka (JP)

(73) Assignee: Kyocera Document Solutions Inc. (JP)

( * ) Notice: Subject to any disclaimer, the term of this patent is extended or adjusted under 35 U.S.C. 154(b) by 357 days.

(21) Appl. No.: 12/955,433

(22) Filed: Nov. 29, 2010

(65) Prior Publication Data

US 2011/0129259 A1 Jun. 2, 2011

(30) Foreign Application Priority Data

| | | | |
|---|---|---|---|
| Nov. 30, 2009 | (JP) | | P2009-271156 |
| Dec. 28, 2009 | (JP) | | P2009-297259 |

(51) Int. Cl.
 *B41J 27/00* (2006.01)
(52) U.S. Cl.
 USPC ............ 347/261; 347/256; 347/257; 347/258
(58) Field of Classification Search
 USPC .................. 347/256–258, 259–263
 See application file for complete search history.

(56) References Cited

U.S. PATENT DOCUMENTS

| | | | |
|---|---|---|---|
| 6,825,872 B2 | 11/2004 | Chikano | 347/263 |
| 2002/0089582 A1 | 7/2002 | Chikano | 347/263 |
| 2004/0104993 A1* | 6/2004 | Yokoyama | 347/241 |
| 2006/0103716 A1 | 5/2006 | Iwamoto | 347/231 |
| 2006/0209375 A1* | 9/2006 | Serizawa | 359/205 |
| 2007/0165099 A1* | 7/2007 | Yoshizawa et al. | 347/245 |
| 2007/0263065 A1* | 11/2007 | Kawasaki | 347/245 |
| 2007/0263270 A1* | 11/2007 | Komai et al. | 359/204 |
| 2012/0081770 A1 | 4/2012 | Sato et al. | 159/204.1 |

FOREIGN PATENT DOCUMENTS

| | | | |
|---|---|---|---|
| CN | 101017356 A | | 8/2007 |
| JP | 3-54913 | | 5/1991 |
| JP | 2002-031772 | | 1/2002 |
| JP | 2002-148542 | | 5/2002 |
| JP | 2002-318522 | | 10/2002 |
| JP | 2006-139152 | | 6/2006 |
| JP | 2007-147826 | | 6/2007 |
| JP | 2008-033135 | | 2/2008 |
| JP | 2008033135 A | * | 2/2008 |
| JP | 2011-039306 | | 2/2011 |

OTHER PUBLICATIONS

Office Action dated Aug. 3, 2012 issued in corresponding Chinese Patent Application No. 201010535910.1 (not submitted herewith).

* cited by examiner

*Primary Examiner* — Stephen Meier
*Assistant Examiner* — Sarah Al Hashimi
(74) *Attorney, Agent, or Firm* — Ostrolenk Faber LLP

(57) ABSTRACT

A housing (30) includes a base portion (30a) for installation of an optical beam emission unit (31), a light guiding unit (35a-39a, 35b-39b), and a deflection unit (32, 33), and a cover portion (30b, 30c) that includes an indented heat emission channel (30b1, 30c1) that transmits heat in an inner portion of the housing (30) to a fluid.

9 Claims, 7 Drawing Sheets

OPTICAL SCANNING APPARATUS AND IMAGE FORMING APPARATUS

CROSS-REFERENCE TO RELATED APPLICATION

This application is a non-provisional application claiming priority to and the benefit of Japanese Patent Application No. 2009-297259, filed Dec. 28, 2009, Japanese Patent Application No. 2009-271156, filed Nov. 30, 2009. The entire contents of which are incorporated herein by reference.

BACKGROUND OF THE INVENTION

1. Field of the Invention

The present invention relates to an optical scanning apparatus and an image forming apparatus.

2. Description of the Related Art

In an image forming apparatus such as a copying machine, a printer, a multifunction peripheral, or the like, a photosensitive member has a surface that is uniformly charged by a charging device and is optically scanned by an optical scanning apparatus to thereby form an electrostatic latent image on its surface in response to image information. Thereafter the electrostatic latent image is developed by a developing device using toner as a developing agent and is visualized as a toner image. The toner image is transferred onto a sheet with a transfer device and fixed onto the sheet by heating and pressure by a fixing device. A series of image forming operations is completed by discharge from the apparatus of the sheet with the toner image fixed thereto.

Conventionally, an optical scanning apparatus which is a principal constituent component of an image forming unit incorporated into an image forming apparatus such as a copying machine, a printer, a multifunction peripheral, or the like has a housing including an internal space having a predetermined volume. This housing accommodates optical components and the like such as a scanning optical system or the like including a plurality of reflective mirrors that return constant-speed scanning light and guide the light to the photosensitive member, such as an optical beam generating device that generates optical beams (laser light) (optical beam emission unit), a polygon mirror formed by a hexagon or the like that deflects the light beams emitted from the optical beam generating device, a polygon motor that rotates and drives the polygon mirror (polygon scanner motor), a control board that mounts electronic components including an IC and supports the polygon motor, and an imaging lens (fθ lens) that images (converts to constant-speed scanning light) the optical beams deflected by the polygon mirror onto the photosensitive member.

However the polygon motor mounted on the control board produces heat when driven. The inner portion of the housing is heated by the heat produced by the polygon motor and therefore the various components disposed in the housing inner portion are affected by the heat. Therefore a heat strategy is typically adopted in an optical scanning apparatus. For example, a method of cooling the inner portion of the housing has been disclosed in which a draft air duct for enabling air flow is formed in the housing to thereby allow heat in the inner portion of the housing to escape to the outside through the draft air duct.

Alternatively, an optical scanning apparatus in which a single deflection device is disposed in a center of the housing to thereby deflect and allocate the optical beams in two symmetrical directions with the deflection device has been proposed.

Alternatively, an optical scanning apparatus has been proposed in which two housings (optical chambers) are disposed in parallel and scan respective light beams in two symmetrical directions about the deflection device. According to this optical scanning apparatus, since the size of one of the housings is reduced, positional deviation of the scanning line is effectively suppressed and problems associated with color shift are suppressed. Alternatively, the effect on color shift caused by the return mirror can be reduced by making the number of return mirrors take a value of one.

However the optical beam generating device, the polygon motor, the optical components and the like are disposed in the housing. When a draft air duct is formed randomly as an indentation with respect to the above type of housing, there is a risk that localized thermal deformation may increase as a result of large change in the shape of the housing from a square shape, and that the installation region for the optical beam generating device, the polygon mirror, the optical components, and the like will be subjected to a high degree of warping. When warping occurs in the installation region for the optical beam generating device, the polygon mirror, the optical components, and the like in the housing, those components become inclined and light beams can no longer be suitably guided.

Alternatively, since the above configuration requires that two light beams scan in one direction, the two light beams must be separated and guided to the photosensitive member and therefore a space with respect to the height direction in the housing must be ensured. Consequently, problems arise in relation to the increased size of the housing. Alternatively, a large width must be ensured in a height direction of the imaging lens provided for constant-speed scanning of the two light beams, and this causes cost increases. The size of the housing is further increased due to the fact that four optical systems for scanning four light beams are all contained in a single housing.

Alternatively, in the above optical scanning apparatus, since the optical path only returns once from the deflection device to the photosensitive member, there is the problem that there is an increase in the width in the height direction of the housing. In particular, when an imaging lens with a long focal length is used, the housing size is increased since the height of the housing increases proportional to the focal length.

Consequently, the thermal deformation amount of the housing due to temperature fluctuation increases, the scanning position of optical beams deviates and therefore tends to result in problems in relation to color shift.

SUMMARY OF THE INVENTION

The present invention, conceived to address the above-mentioned problem, is designed to enable reduction in size of an optical scanning apparatus and to suppress failure of light guiding of optical beams resulting from thermal deformation in a housing.

In order to solve the above-mentioned problem, an optical scanning apparatus of the present invention may include an optical beam emission unit that emits an optical beam, a light guiding unit that guides the optical beam, a deflection unit that deflects the optical beam, and a chamber-shaped housing that accommodates the optical beam emission unit, the light guiding unit, and the deflection unit. The housing includes a base portion for installation of the optical beam emission unit, the light guiding unit, and the deflection unit, and a cover portion that includes an indented heat emission channel that transmits heat in the housing to a fluid.

According to this aspect of the present invention, the housing includes the base portion enabling installation of the optical beam emission unit, the light guiding unit and the deflection unit, and a cover portion including the indented heat emission channel that transmits the heat in the housing to the fluid. Therefore thermal deformation in the housing resulting from the heat emission channel is concentrated in the cover portion and the effect on the base portion which installs the optical beam emission unit, the light guiding unit and the deflection unit can be reduced. Therefore according to this aspect of the present invention, light-guiding failure of the optical beams in the optical scanning apparatus caused by thermal deformation of the housing can be suppressed.

According to this aspect of the present invention, since the optical beams deflected by the deflection device are returned by the reflective mirror and travel along the upper surface and the lower surface of the base plate of the housing, the width of the housing with reference to a direction of height can be effectively suppressed and therefore enables downsizing of the housing.

In order to solve the above-mentioned problem, an optical scanning apparatus may accommodate a scanning optical system in the housing. The scanning optical system may include a deflection device that deflects the optical beams emitted from a light source, an imaging lens that converts the optical beams deflected by the deflection device to constant-speed scanning light, and a first, second and third reflective mirror returning the constant-speed scanning light and guiding the light to the photosensitive member. The housing of the optical scanning apparatus may form a base plate that partitions the housing into an upper and a lower portion. The deflection device, and the first reflective mirror and the imaging lens of the scanning optical system may be disposed on one surface of the base plate along the direction of propagation of the optical beams. The second and third reflective mirrors of the scanning optical system may be disposed on the other surface of the base plate along the direction of propagation of the optical beams. A first opening may be formed between the imaging lens and the first reflective mirror on an optical path connecting the photosensitive member with the third reflective mirror on the base plate above. A second opening may be formed on the optical path connecting the first reflective mirror with the second reflective mirror on the base plate.

According to this aspect of the present invention, since two optical scanning apparatuses that can optically scan two photosensitive members at the same time are disposed in parallel on a color image forming apparatus, a total of four photosensitive members can be optically scanned by optical beams corresponding to four-color (magenta, cyan, yellow and black) image information. However since a first opening is formed between the imaging lens and the first reflective mirror on an optical path connecting the third reflective mirror and the photosensitive member on the base plate formed on the housing of each optical scanning apparatus, a substantially uniform pitch is enabled between the four photosensitive members.

DETAILED DESCRIPTION OF THE PREFERRED EMBODIMENTS

The embodiments of an optical scanning apparatus and an image forming apparatus will be described below referring to the figures. In the figures below, the dimensions of each member has been suitably varied to thereby show each member in a size that enables recognition. In the following description, an example of an image forming apparatus according to the present invention will be described with reference to a copying machine.

Figure 1:
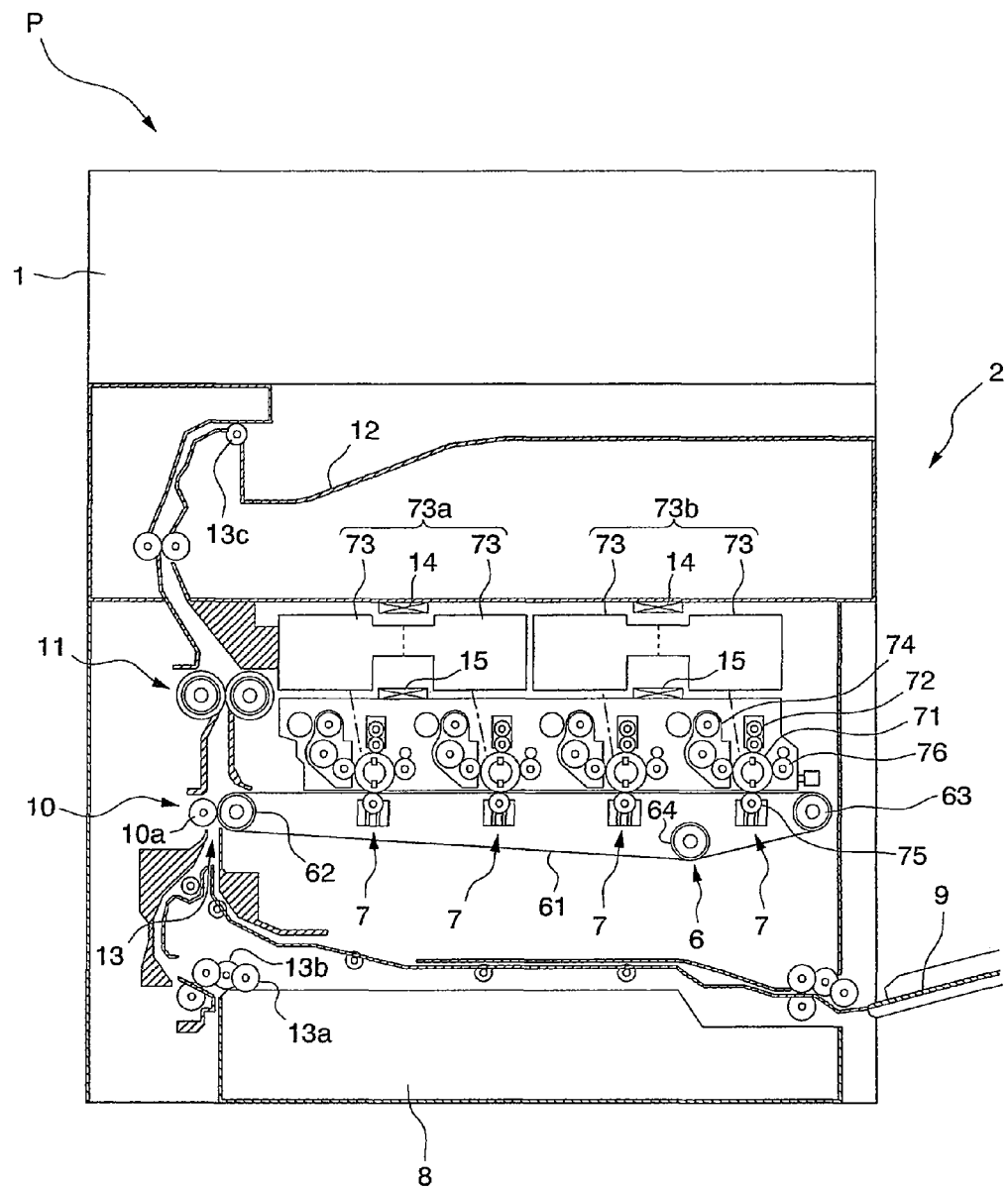
FIG. 1 is a sectional view showing a schematic configuration of a copying machine.

FIG. 1 is a sectional view showing a schematic configuration of a copying machine P according to the present embodiment. As shown in the figure, the copying machine P according to the present embodiment includes an image reading unit 1 for reading an image of a document and a printing unit 2 that performs printing onto a recording sheet (recording medium) based on the read image data.

The image reading unit 1 illuminates light onto the image of the document to thereby read the image of the document as image data by receiving the reflected light and includes a light source apparatus that illuminates light onto the document or a light-receiving sensor or the like that converts return light from the document.

The printing unit 2 includes a belt unit 6, an image forming unit 7, a sheet cassette 8, a paper feed tray 9, a secondary transfer unit 10, a fixing unit 11, a paper discharge tray 12, and a feed conveyance path 13.

The belt unit 6 transfers the toner image formed on the image forming unit 7 and conveys the transferred toner image. The belt unit 6 includes an intermediate transfer belt 61 on which the toner image is transferred from the image forming unit 7, an endlessly forwarding drive roller 62 linked to the intermediate transfer belt 61, a driven roller 63 and a tension roller 64. The intermediate transfer belt 61 is configured by stretching across the drive roller 62, the driven roller 63, and tension roller 64. The drive roller 63 is connected to a drive unit that includes a drive source such as a motor or the like, and rotates and imparts a gripping force to the intermediate transfer belt 61. The driven roller 63 rotates by being rotated and driven by the drive roller 62. The tension roller 64 is a type of driven roller that is rotated and driven by being driven by the rotations of the drive roller 62, and includes a resilient mechanism to thereby apply a tension to the intermediate transfer belt 61. Furthermore the belt unit 6 also includes a cleaning unit (not shown) which is configured to remove residual toner and the like from the intermediate transfer belt 61.

An image forming unit 7 is provided corresponding respectively to the colors yellow (Y), magenta (M), cyan (C), and black (BK), and forms a toner image in each color. These image forming units 7 are arrayed along the intermediate transfer belt 61. Each image forming unit 7 has a photosensitive member 71, a charging device 72, a laser scanning unit 73 (optical scanning apparatus), a developing device 74, a primary transfer roller 75, a cleaning apparatus 76, and a neutralization apparatus (not shown). The photosensitive member 71 is formed as a cylinder and a toner image is formed on the periphery of the photosensitive member 71 based on an electrostatic latent image. The charging device 72 is opposed to the photosensitive member 71 and places the peripheral face of the photosensitive member 71 into a charged state. The laser scanning unit 73 scans laser light that is emitted based on the printing format for the image data on the peripheral surface of the charged photosensitive member 71. The developing device 74 develops the toner image based on the electrostatic latent image on the peripheral surface of the photosensitive member 71 by supply of toner to the peripheral surface of the photosensitive member 71. The primary transfer roller 75 is opposed to the photosensitive member 71 to sandwich the intermediate transfer belt 61 and thereby executes primary transfer of the toner image developed by the photosensitive member 71 into the intermediate transfer belt 61. The cleaning apparatus 76 removes residual toner from the photosensitive member 71 after primary transfer.

The sheet cassette 8 is freely detachable from the apparatus main body and contains recording paper. The paper feed tray 9 opens and closes freely with respect to the apparatus main body and contains the recording paper. The secondary transfer unit 10 executes secondary transfer of the image formed on the intermediate transfer belt 61 onto the recording body and is configured from the drive roller 62 that is driven by the intermediate transfer belt 61 and the secondary transfer roller 10a that is opposed to the drive roller 62 to sandwich the intermediate transfer belt 61. The fixing unit 11 fixes the toner image that is subjected to secondary transfer on the recording body onto the recording paper, and includes a heating roller that fixes the toner image onto the recording paper by pressure and heating. The feed conveyance path 13 includes a pick-up roller 13a that conveys the recording paper from the sheet cassette 8, a paper feed roller 13b that conveys the recording body, and a discharge roller 13c that discharges the recording body to the paper discharge tray 12.

As described above, the copying machine P according to the present embodiment that has the above type of configuration acquires image data by the image reading unit 1, and the printing unit 2 performs printing operations onto the recording paper based on the image data.

Figure 2:
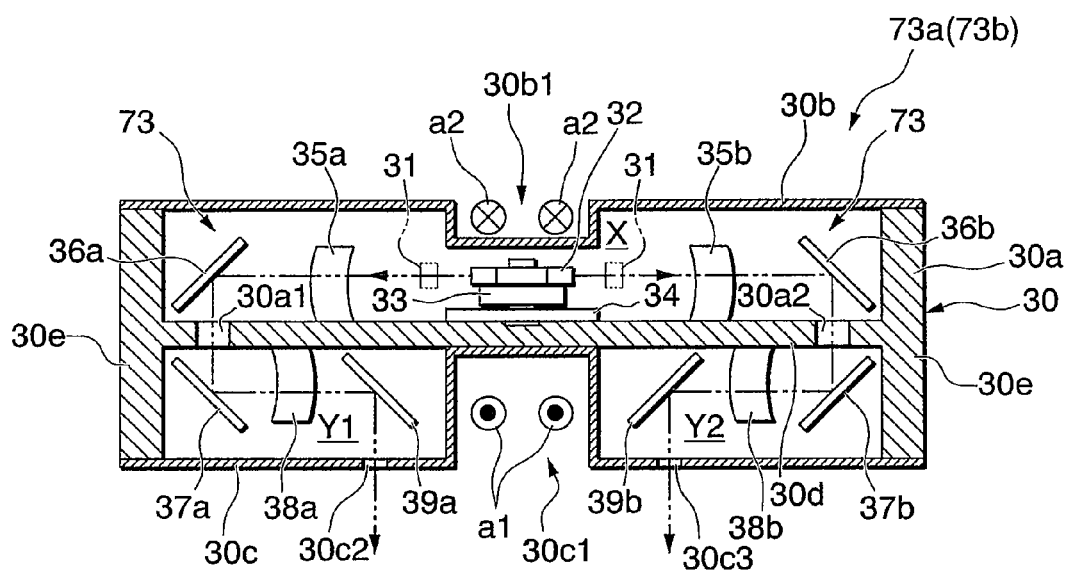
FIG. 2 is a sectional view showing the schematic configuration of a laser scanning unit provided in the copying machine.
Figure 3:
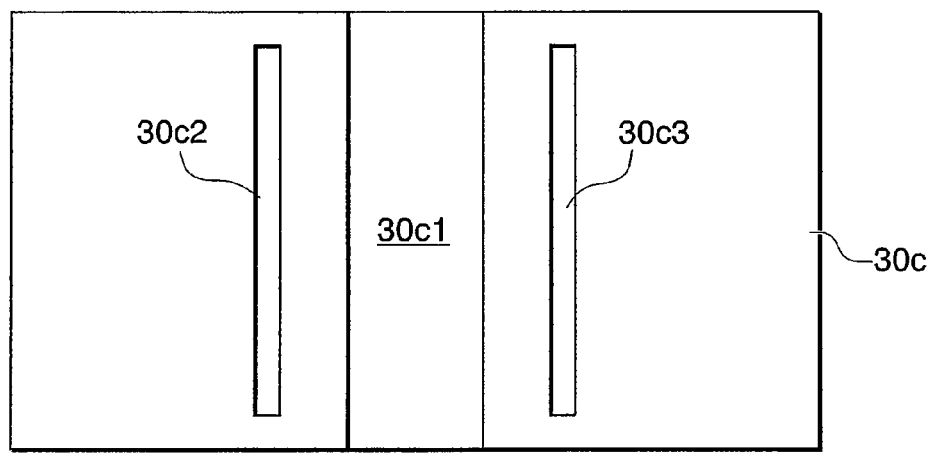
FIG. 3 is a lower view of a laser scanning unit provided in the copying machine.

Next, the laser scanning unit (LSU) 73 in the copying machine P according to the present embodiment will be described with reference to FIG. 2 and FIG. 3. The laser scanning unit 73 as described above is provided respectively in accordance to each color of yellow (Y), magenta (M), cyan (C), and black (BK). In the present embodiment, the apparatus is downsized by integrating the laser scanning unit 73 that is provided for yellow (Y) and the laser scanning unit 73 that is provided for magenta (M) to form the laser scanning unit 73a and integrating the laser scanning unit 73 that is provided for cyan (C) and the laser scanning unit 73 that is provided for black (BK) to form the laser scanning unit 73b. The laser scanning units 73a and 73b have the same configuration and therefore the following description will only describe the laser scanning unit 73a. FIG. 2 is a sectional view of the laser scanning unit 73a and FIG. 3 is a lower view of the laser scanning unit 73a.

The laser scanning unit 73a includes a housing 30, an optical beam generating device 31 (optical beam emission unit), a polygon mirror 32, a polygon motor 33, a control board 34, and optical components 35a-39a, 35b-39b. In the present embodiment, the light beams are deflected by the polygon mirror 32 and the polygon motor 33. In other words, the deflection unit in the present embodiment is configured from the polygon mirror 32 and the polygon motor 33. In the present embodiment, the light beams are guided by the optical components 35a-39a, 35b-39b. In other words, the guiding unit in the present embodiment is configured from optical components 35a-39a, 35b-39b.

The housing 30 is formed from synthetic resin in an empty box-shape, and as shown in FIG. 2, includes the base portion 30a, the upper cover 30b (cover portion), and the lower cover 30c (cover portion).

The base portion 30a includes the optical beam generating device 31, a polygon mirror 32, a polygon motor 33, a control board 34, and optical components 35a-39a, 35b-39b, and upper end and lower end thereof are opened. Furthermore the upper cover 30b closes the upper end of the base portion 30a and the lower cover 30c closes the lower end of the base portion 30a. The upper cover 30b and the lower cover 30c include indented heat emission channels 30b1, 30c1 that transfer heat in the lower inner portion of the housing 30. In other words, the copying machine P according to the present embodiment disposes the covers (the upper cover 30b and the lower cover 30c) with reference to the top and the bottom of the base portion 30a, and each cover (the upper cover 30b and the lower cover 30c) includes the heat emission channels 30b1, 30c1.

More precisely, the base portion 30a is configured by integrating a housing base plate 30d, which is divided into two on the upper and lower portions of the inner portion of the housing 30, and a side wall 30e of the housing 30. Slits 30a1, 30a2 allowing passage of optical beams reflected by the optical components 36a, 36b (reflective mirrors) are respectively disposed in proximity to the right and left side walls 30e of the housing base plate 30d.

The upper end of the base portion 30a is covered by an upper cover 30b, and the lower end of the base portion 30a is covered by the lower cover 30c. An indented heat emission channel 30c1 is formed along the entire portion of the lower cover 30c (in FIG. 3, the entire portion from the upper end to the lower end) passing through the central portion on the outer side of the lower cover 30c. The most depressed portion of the heat emission channel 30c1 (the upper end of the heat emission channel 30c1 in FIG. 2) is configured to come into contact with the bottom surface of the housing base plate 30d. Furthermore slits 30c2, 30c3 are respectively provided to allow passage of light beams reflected by the optical components 39a, 39b (reflective mirror) as described hereafter in proximity to the heat emission channel 30c1. In other words, the housing 30 uses the housing base plate 30d to form an upper chamber X on an upper side thereof and lower chambers Y1, Y2 divided into two by the heat emission channel 30c1 is formed on a lower side of the housing base plate 30d. Herein, the housing 30 is divided into two upper and lower portions by the housing base plate 30d. However when the laser scanning unit 73a shown in FIG. 2 is provided vertically by rotating through 90 degrees, the housing base plate 30d divides the housing 30 into right and left portions. Therefore as used herein "the housing is divided into upper and lower portions" in this embodiment of the present invention means that the housing 30 is simply divided into two.

The optical beam generating device 31 is fixed to the housing 30, and is fixed to the side wall 30e of the base portion 30a that is positioned on the inner side of the face of the paper in FIG. 2. The optical beam generating device 31 illuminates light beams towards the polygon mirror 32 that is provided in the housing 30.

The polygon mirror 32 deflects light beams emitted from the optical beam generating device 31, and is formed as a polygon (in the example shown in the figure, a hexagon is shown). The outer periphery of the polygon mirror 32 is formed by reflective mirror, and the central position thereof is mounted by passing through the rotation shaft of the polygon motor 33.

The polygon motor 33 rotates and drives the polygon mirror 32, and for example is configured by a precision motor formed from a DC brushless motor or the like. The polygon motor 33 is installed on the control board 34.

The control board 34 is formed from a plate member including metal and has a planar shape in a rectangular shape. The control board 34 is fixed at the four corners thereof via a machine screw (not shown) so that the rear surface thereof comes into contact with an upper surface of the housing base plate 30d. Furthermore the polygon motor 33 is fixed to the surface side (the upper side) of the control board 34. Although omitted from FIG. 2, an electronic component such as a driving IC or the like for the polygon motor 33 is mounted on the surface of the control board 34. The control board 34 is provided in a central portion of the upper surface of the housing base plate 30d due to the relationship in which the polygon mirror 32 is provided in a central portion of the upper surface of the housing base plate 30d.

The optical components 35a, 35b of the optical components 35a-39a, 35b-39b are an imaging lens (fθ lens) provided in the upper chamber X, operate to focus the light beams illuminated from the polygon mirror 32 and are disposed on the right and the left with the polygon mirror 32 in the center. The optical components 36a, 36b are reflective mirrors, and are provided respectively on an outer side of the optical components 35a, 35b to thereby respectively guide light beams emitted from the polygon mirror 32 through the slits 30c2, 30c3 into the lower chambers Y1, Y2. The optical components 37a, 37b are reflective mirrors provided respectively in the lower chambers Y1, Y2 and are configured to enable illumination of light beams guided through the slits 30a1, 30a2 into the lower chambers Y1, Y2. The optical components 38a, 38b are long lenses provided respectively in the lower chambers Y1, Y2, and are provided respectively more towards an inner side (the side of the heat emission channel 30c1) than the optical components 37a, 37b. These optical components 38a, 38b operate to enable uniform illumination without magnification differences of light beams illuminated respectively from the optical components 37a, 37b onto the photosensitive member 71. The optical components 39a, 39b are reflective mirrors, are provided more towards an inner side than the optical components 38a, 38b (the heat emission channel 30c side) to thereby emit the light onto the photosensitive member 71 through the slits 30c2, 30c3.

The optical components 35a-39a, 35a-39b in the present embodiment are provided to extend in the same direction and extend in the same direction as the heat emission channel 30b1, 30c1.

Furthermore as shown in FIG. 1, the copying machine P in the present embodiment includes a fan apparatus 14 that flows air into the heat emission channel 30b1 of the upper cover 30b, and a fan apparatus 15 that flows air into the heat emission channel 30c1 of the lower cover 30c. In the present embodiment, as shown in FIG. 2, these fan apparatuses 14, 15 form an air flow a1 inwardly from the front of the page in the heat emission channel 30b1 of the upper cover 30b, and an air flow a2 is formed towards the front from the inner part of the page in the heat emission channel 30c1 of the lower cover 30c. That is to say, in the present embodiment, the direction of flow of the air flow a1 flowing towards the heat emission channel 30b1 of the upper cover 30b is opposite to the direction of flow of the air flow a2 flowing towards the heat emission channel 30c1 of the lower cover 30c. Conventionally, a copying machine may include a fan apparatus for cooling the photosensitive member 71 or the like. In this case, either of the fan apparatuses 14, 15 may be incorporated into the existing fan apparatus. In this manner, the number of installations of the fan apparatus may be decreased thereby enabling downsizing of the copying machine.

The laser scanning unit 73a, 73b configured in this manner emits light beams from the optical beam generating device 31 based on image data. The light beams are illuminated onto the polygon mirror 32. The optical beams that illuminated onto the polygon mirrors 32 are scanned by rotation of the polygon mirror 32. The scanned light beams are guided onto the photosensitive member 71 through the optical components 35a, 35b (fθ lens), the optical components 36a, 36b (reflective mirror), the optical components 37a, 37b (reflective mirror), the optical components 38a, 38b (elongated lens), and the optical components 39a, 39b (reflective mirror). An electrostatic latent image is formed on the photosensitive member 71 by the emitted light beams based on the detection signal for determining the write start position of the image on the photosensitive member 71.

The housing 30 of the laser scanning unit 73 provided in the copying machine P according to the present embodiment includes a base portion 30a that is provided with the optical beam generating device 31, the polygon mirror 32, the polygon motor 33, the control board 34, and the optical components 35a-39a, 35b-39b, and the cover portion (upper cover 30b, lower cover 30c) that is provided with the indented heat emission channel 30b1, 30c1 to transfer heat in the housing 30 to the air flow a1, a2. As a result, the heat deformation of the housing 30 resulting from the heat emission channel 30b1, 30c1 is concentrated in the cover portion (upper cover 30b, lower cover 30c), and therefore the effect is decreased on the base portion 30a on which the optical beam generating device 31, the polygon mirror 32, the polygon motor 33, the control board 34, and the optical components 35a-39a, 35b-39b are installed. Therefore, the laser scanning unit 73 provided in the copying machine P according to the present embodiment enables suppression of light-guiding failure of light beams resulting from thermal deformation of the housing 30.

The laser scanning unit 73 that is provided in the copying machine P according to the present embodiment provides respective cover portions (upper cover 30b, lower cover 30c) above and below the base portion 30a, and each cover portion (upper cover 30b, lower cover 30c) is provided with a heat emission channel 30b1, 30c1. Consequently, heat in the housing 30 can be radiated from both upper and lower directions, and therefore heat in the housing can be more effectively radiated to the outside.

In the above embodiment, a single polygon mirror 32 and a polygon motor 33 deflect light beams emitted from two optical beam generating devices 31. As a result, in comparison with providing a polygon mirror and polygon motor respectively for each light beam emitted from the optical beam generating device 31, the number of polygon mirrors and polygon motors can be reduced. Furthermore according to the present embodiment, the polygon mirror 32 and polygon motor 33 can be disposed in the center of the base portion 30a, and therefore the heat emission channel 30b1, 30c1 can be formed above and below the polygon mirror 32 and polygon motor 33. Consequently, heat can be radiated from both above and below the polygon mirror 32 and polygon motor 33, and therefore enabling more efficient radiation of heat in the housing 30 to the outside.

In the present embodiment, the inner portion of the housing 30 is divided by the heat emission channel 30c1 into the region guiding the light beams emitted from one of the optical beam generating devices 31 (lower chamber Y1) and the region guiding the light beams emitted from the other optical beam generating device 31 (lower chamber Y2). Consequently, there is no need to separately provide a partition to separate into two regions (lower chamber Y1 and lower chamber Y2), and consequently, the material forming the housing can be reduced.

In the laser scanning unit 73 provided in the copying machine P according to the present embodiment, heat emission channels 30b1, 30c1 are provided extending in the same direction, and therefore the direction of flow of the air flow a1, a2 with respect to each heat emission channel 30b1, 30c1 is opposite. Consequently, cold air flow from both sides flows into the heat emission channel 30b1, 30c1 in the direction of extension of the heat emission channel 30b1, 30c1, and therefore uniform cooling of the laser scanning unit 73 is enabled.

Furthermore the optical components 35a-39a, 35b-39b in the laser scanning unit 73 provided in the copying machine P according to the present embodiment extend in the same direction, and extend in the same direction as the heat emission channel 30b1, 30c1. As a result, the air flow a1, a2 flows along the optical components 35a-39a, 35b-39b, and enables suppression of the thermal deformation of the optical components 35a-39a, 35b-39b for all of the optical components 35a-39a, 35b-39b.

Another embodiment according to the present invention will be described below. Those portions that are the same as those in the embodiments above are omitted from the following description for the sake of simplicity.

Figure 4:
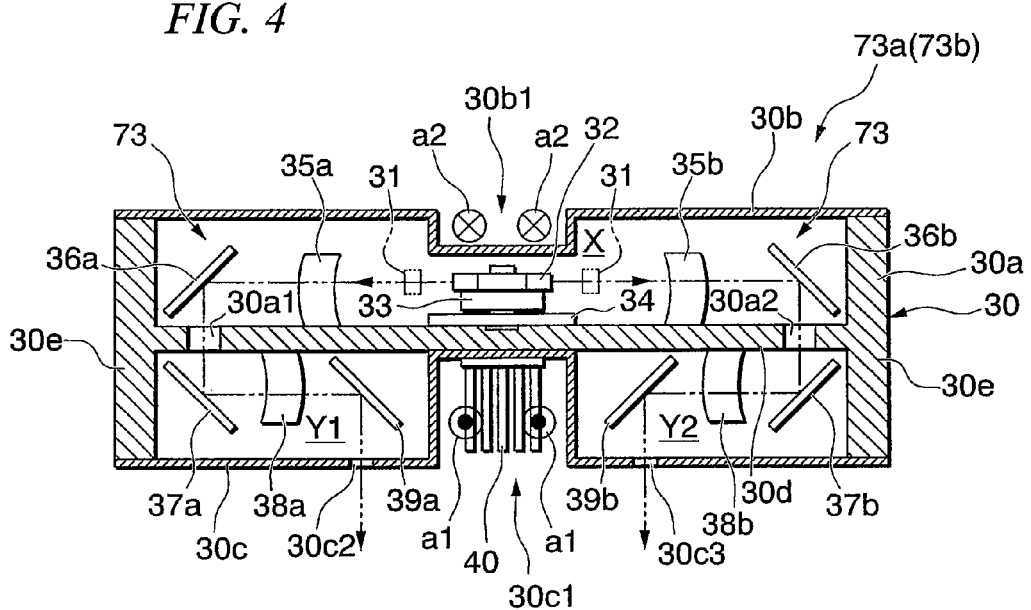
FIG. 4 is a sectional view showing the schematic configuration of a laser scanning unit provided in the copying machine.

FIG. 4 is a sectional view showing the schematic configuration of a laser scanning unit 73a according to the present embodiment. As shown in the figure, the laser scanning unit 73a in the copying machine P according to the present embodiment is disposed in the heat emission channel 30c1, and is provided with a heat transfer fin 40 (heat transfer unit) to transfer heat from the polygon motor 33 to the heat emission channel 30c1. The heat transfer fin 40 is configured by a plurality of fan members which extend to the flow direction of the air flow a1 in the heat emission channel 30c1 (to the longitudinal direction of the heat emission channel 30c1) and are installed to stand substantially perpendicular to the flow direction (substantially parallel to the side wall face of the heat emission channel 30c1).

The provision of the heat transfer fin 40 in this manner increases the surface area with respect to the air flow a1 and enables effective radiation of heat from the polygon motor 33 to the heat emission channel 30c1.

Next, another embodiment of the present invention will be described making reference to the attached figures.

Figure 5:
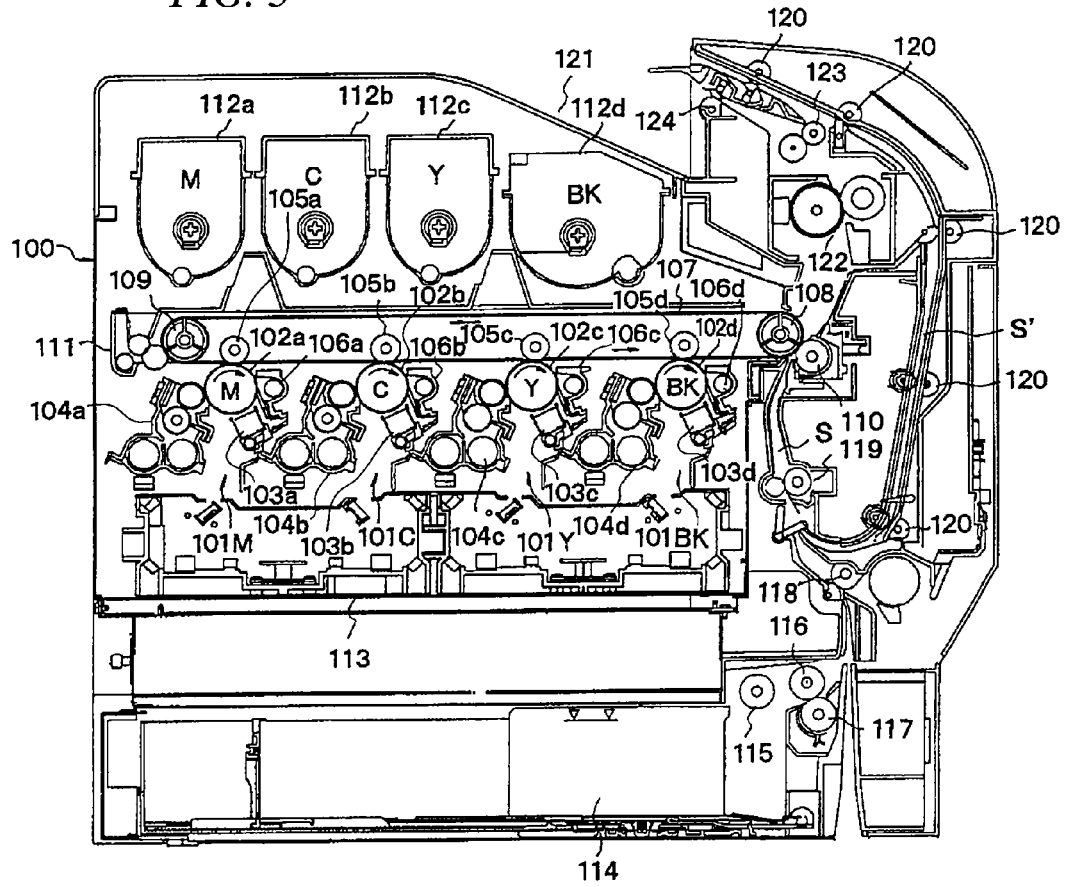
FIG. 5 is a sectional view of an image forming apparatus (color laser printer).

FIG. 5 is a sectional view of a color laser printer according to an embodiment of an image forming apparatus of the present invention. The color laser printer in the figure is a tandem type printer, and a magenta image forming unit 101M, a cyan image forming unit 101C, a yellow image forming unit 101Y, and a black image forming unit 101K are disposed at a fixed interval in tandem in a central portion in the main body 100 of the printer.

Photosensitive drums 102a, 102b, 102c, 102d are respectively disposed as photosensitive bodies on each of the image forming units 101M, 101C, 101Y, 101BK. A charging device 103a, 103b, 103c, 103d, a developing device 104a, 104b, 104c, 104d, a transfer roller 105a, 105b, 105c, 105d, and a drum cleaning apparatus 106a, 106b, 106c, 106d are respectively disposed in the periphery of each photosensitive drum 102a-102d.

The photosensitive drums 102a-102d are drum-shaped photosensitive bodies, and are rotated at a predetermined processing speed in the direction of the arrow in the figure (clockwise direction) by a drive motor (not shown). Alternatively, the charging devices 103a-103d apply a uniform charge with a predetermined potential to the surface of the photosensitive drum 102a-102d with a charging device that is charged by a charging device power source (not shown).

The developing devices 104a-104d respectively contain magenta (M), toner, cyan (C) toner, yellow (Y) toner, and black (BK) toner, attach toner of each color to each electrostatic latent image formed on each photosensitive drum 102a-102d, and visualize each electrostatic latent image as toner images having respective colors.

Alternatively, the transfer rollers 105a-105d are disposed to enable abutment with each photosensitive drum 102a-102d through the intermediate transfer belt 107 with each primary transfer unit. The intermediate transfer belt 107 is stretched between the drive roller 108 and the tension roller 109 to thereby enable scanning on an upper surface of each photosensitive drum 102a-102d. The drive roller 108 is disposed to enable abutment with the secondary transfer roller 110 though the intermediate transfer belt 107 at the primary transfer unit. Alternatively, a belt cleaning apparatus 111 is disposed in proximity to the tension roller 109.

However toner containers 112a, 112b, 112c, 112d for replenishing toner in each developing device 104a-104d are arrayed in a line above each image forming unit 101M, 101C, 101Y, 101K in the printer main body 100.

Alternatively, two optical scanning apparatuses 113 are disposed with respect to the paper conveying direction below each image forming unit 101M, 101C, 101Y, 101K in the printer main body 100, and a sheet cassette 114 is detachably disposed on the bottom portion of the printer main body 100 below the optical scanning apparatus 113. A plurality of paper sheets (not shown) is stacked and contained in the sheet cassette 114. A pickup roller 115 for removing paper from the sheet cassette 114, a feed roller 116 for separating removed sheets and transferring individual sheets to the conveyance path S, and a retard roller 117 are provided in proximity to the sheet cassette 114.

Alternatively, a conveying roller pair 118 that conveys a sheet and a resist roller pair 119 that stands by for a predetermined period and supplies paper at a predetermined timing to a secondary transfer unit that is the abutment portion of the drive roller 108 with the secondary transfer roller 110 are provided in the conveyance path S extending vertically in the side portion of the printer main body 100. Another conveyance path S' used when forming an image on both sides of a sheet is formed on the side of the conveyance path S, and a plurality of reversing roller pairs 120 are provided at a suitable interval in the conveyance path S'.

However, the conveyance path S disposed vertically on one side portion in the printer main body 100 extends to the paper discharge tray 121 provided on an upper surface of the printer main body 100. A fixing apparatus 122 and discharge roller pairs 123, 124 are provided along the path S.

Next, the operation of image formation by the color laser printer having the above configuration will be described.

When an image formation start signal is produced, the respective photosensitive drums 102a-102d in the respective image forming units 101M, 101C, 101Y, 101K are rotated at a predetermined process speed in the direction of the arrow (clockwise direction) in the figure. These photosensitive drums 102a-102d are uniformly charged by the charging device 103a-103d. Respective optical scanning apparatuses 113 emit light beams that are modulated by the color image signal for each color, those light beams are emitted to the surface of the respective photosensitive drums 102a-102d, and form respective electrostatic latent images corresponding to the color image signals on the respective photosensitive drums 102a-102d.

Firstly magenta toner is attached to the electrostatic latent image formed on the photosensitive drum 102a of the magenta image forming unit 101M by the developing device 104a to which the developing bias that has the same polarity as the charged polarity of the photosensitive drum 102a is applied. That electrostatic latent image is then visualized as a magenta toner image. The magenta toner image is subjected to primary transfer onto the intermediate transfer belt 107 that is rotated in the direction of the arrow in the figure by the action of the transfer roller 105a to which the primary transfer bias that has the opposite polarity to the toner is applied in the primary transfer unit (transfer nip portion) between the photosensitive drum 102a and the transfer roller 105a.

In this manner, the intermediate transfer belt 107 on which the magenta toner image undergoes primary transfer is transferred to the cyan image forming unit 101C. In the same manner as above, in the cyan image forming unit 101C, the cyan toner image formed on the photosensitive drum 102b is transferred and superimposed on the magenta image on the intermediate transfer belt 107 in the primary transfer unit.

In the same manner thereafter, a yellow and a black image formed respectively in the photosensitive drums 102c, 102d of the yellow and black image forming units 101Y, 101K are sequentially superimposed in the respective primary transfer units on the magenta and cyan toner image that is superimposed and transferred onto the intermediate transfer belt 107, to thereby form a full-color toner image on the intermediate transfer belt 107. Residual toner remaining on the photosensitive drums 102a-102d without being transferred onto the intermediate transfer belt 107 is removed by the drum cleaning apparatuses 106a-106d and therefore each photosensitive drum 102a-102d is provided for use in the following image formation.

When the distal end of the full-color toner image on the intermediate transfer belt 107 reaches the secondary transfer unit (transfer nip portion) between the drive roller 108 and the secondary transfer roller 110, the sheet conveyed from the sheet cassette 114 to the pick-up roller 115, the feed roller 116 and the retard roller 117 are conveyed to the secondary transfer unit by the resist roller pair 119. Then a full-color toner image is subjected to secondary transfer in a single operation from the intermediate transfer belt 107 onto the sheet conveyed to the secondary transfer unit by the secondary transfer roller 110 to which a secondary transfer bias that has an opposite polarity to the polarity of the toner is applied.

The sheet receiving the transfer of the full-color toner image is conveyed to the fixing apparatus 122, and the full-color toner image is heat fixed onto the sheet by application of heat and pressure, and then the sheet with the fixed toner image is discharged into the paper discharge tray 121 by the discharge roller pair 123, 124, to thereby complete a series of image forming operations. Residual toner that remains on the intermediate transfer belt 107 without transfer onto the sheet is removed by the belt cleaning apparatus 111 to thereby prepare the intermediate transfer belt 107 for the next image forming operation.

Figure 6:
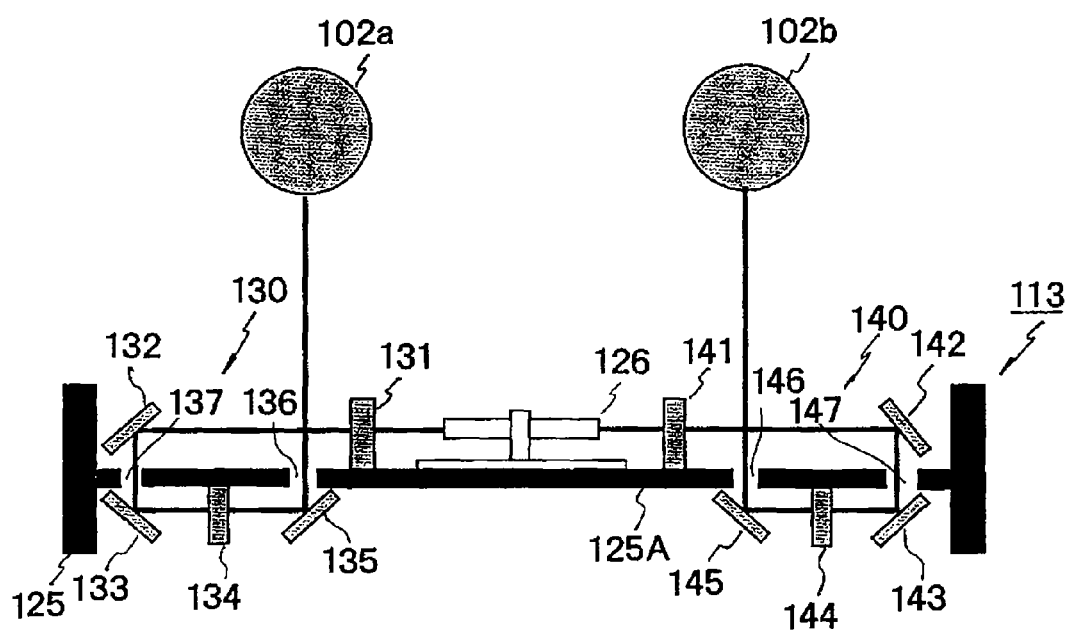
FIG. 6 is a sectional view of the main scanning of a single optical scanning apparatus.
Figure 7:
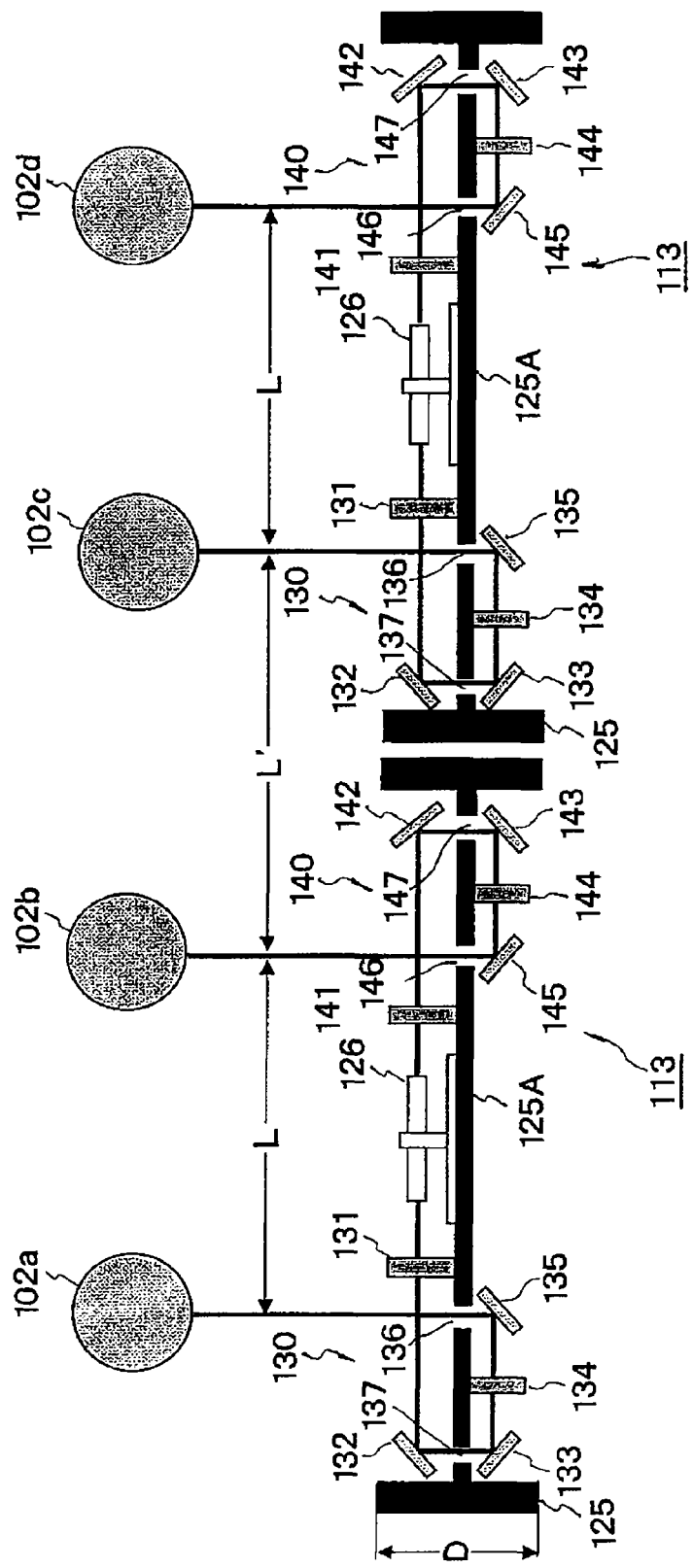
FIG. 7 is a sectional view of the main scanning of two optical scanning apparatuses.

The optical scanning apparatus according to the present invention will be described below making reference to FIG. 6 and FIG. 7. FIG. 6 is a sectional view of the main scanning of a single optical scanning apparatus according to the present invention. FIG. 7 is a sectional view of the main scanning of two optical scanning apparatuses according to the present invention.

Since the basic configuration of the two optical scanning apparatuses in FIG. 7 is the same, the configuration of the single optical scanning apparatus 113 in FIG. 6 will be described. The optical scanning apparatus 113 has a housing 125 that is integrally formed from resin. A horizontal base plate 125A is integrally formed to partition the upper and lower inner portion of the housing 125. A polygon mirror 125 that is a deflection apparatus is disposed in a central portion of the upper surface of the base plate 125A of the housing 125. Two scanning optical systems 130, 140 are disposed symmetrically on both sides about the polygon mirror 126 on the upper and lower surfaces of the base plate 125A in the housing 125.

The scanning optical systems 130, 140 are respectively provided with a first imaging lens 131, 141 and a first reflective mirror 132, 142 disposed along the direction of propagation of light beams on the upper surface of the base plate 125A inside the housing 125 and a second imaging lens 133, 143, a second reflective mirror 134, 144 and a third reflective mirror 135, 145 disposed along the direction of propagation of light beams on the lower surface of the base plate 125A. Although this is not shown, the each scanning optical system 130, 140 is also provided with a cylindrical lens, a collimator lens, and a laser diode as a light source accommodated in the housing 125.

The single optical scanning apparatus 113 shown in FIG. 6 uses exposure light to scan the photosensitive drum 102a of the magenta image forming unit 101M and the photosensitive drum 102b of the cyan image forming unit 101C shown in FIG. 5. In each scanning optical system 130, 140, respective first openings 136, 146 are formed on the optical path connecting the third reflective mirror 135, 145 and the photosensitive drum 102a, 102b between the first imaging lens 131, 141 and the first reflective mirror 132, 142, and second openings 137, 147 are formed on the optical path connecting the first reflective mirror 132, 142 and the second reflective mirror 133, 143 of the base plate 125A.

Light beams that are emitted from the laser diode (not shown) that is provided in each scanning optical system 130, 140 in this single optical scanning apparatus 113 are concentrated into a linear optical flux by the collimator lens, and a cylindrical lens (not shown) to become incident upon the rotated and driven polygon mirror 126 from two symmetrical directions.

Each light beam that becomes incident upon the polygon mirror 126 is deflected by the polygon mirror 126, and then is converted to constant-speed scanning light by passing through the first imaging lens 131, 141. The constant-speed scanning light is returned orthogonally in a downward direction by the first reflective mirrors 132, 142, passes through the second openings 137, 147 that are formed on the base plate 125A, reaches the second reflective mirror 133, 143, returns orthogonally by the second reflective mirrors 133, 143, and proceeds horizontally along the lower surface of the base plate 125A. Thereafter the light beam passes through the second imaging lens 134, 144, reaches the third reflective mirror 135, 145, is returned upwardly in an orthogonal direction by the third reflective mirrors 135, 145, passes through the first opening 136, 146 formed in the base plate 125A toward the photosensitive drum 102a, 102b and therefore respectively exposes and scans the photosensitive drums 102a, 102b.

Although the single optical scanning apparatus 113 shown in FIG. 6 exposes and scans the photosensitive drum 102a of the magenta image forming unit 101M and the photosensitive drum 102a of the cyan image forming unit 101C shown in FIG. 5, the color laser printer shown in FIG. 5 includes two aligned optical scanning apparatuses 113 that are the same as FIG. 7 to thereby use light beams to expose and scan all of the four photosensitive drums 102a-102d including the yellow image forming unit 101Y and the black image forming unit 101 B K using the two optical scanning apparatuses 113. In FIG. 7, the same reference numerals denote the same elements configuring the two optical scanning apparatuses 113.

In the optical scanning apparatus 113, light beams that are deflected by the polygon mirror 126 are returned by the first reflective mirror 132, 142 and the second reflective mirror 133, 143 and proceed along the upper surface and lower surface of the base plate 125A of the housing 125 and therefore enable a reduction in the width with respect to the direction of height of the housing 125 as well as downsizing of the housing 125 and downsizing of the overall optical scanning apparatus 113.

In the present embodiment, since the two scanning optical systems 130, 140 are disposed symmetrically on both sides about the polygon mirror 126 in a central portion in the housing 125, the two photosensitive drums 102a and 102b, or 102c and 102d, can simultaneously be scanned by the single optical scanning apparatus 113.

Since the two optical scanning apparatuses 113 that enable simultaneous scanning of the four photosensitive drums 102a-102d as described above are aligned on the color laser printer as shown in FIG. 5, the four photosensitive drums 102a-102d are scanned using light beams in accordance with image information for the four colors (magenta, cyan, yellow and black). However since first openings 136, 146 are formed between the first imaging lens 131, 141 and the first reflective mirror 132, 142 on the optical path connecting the third reflective mirror 135, 145 and the photosensitive drums 102a-102d of the base plate 125A formed on the housing 125 of each optical scanning apparatus 113, the pitch L, L' between the four photosensitive drums 102a-102d can be substantially equalized and the guiding distance for the return optical path on the lower surface of the base plate 125A can be used to a maximum.

Figure 8:
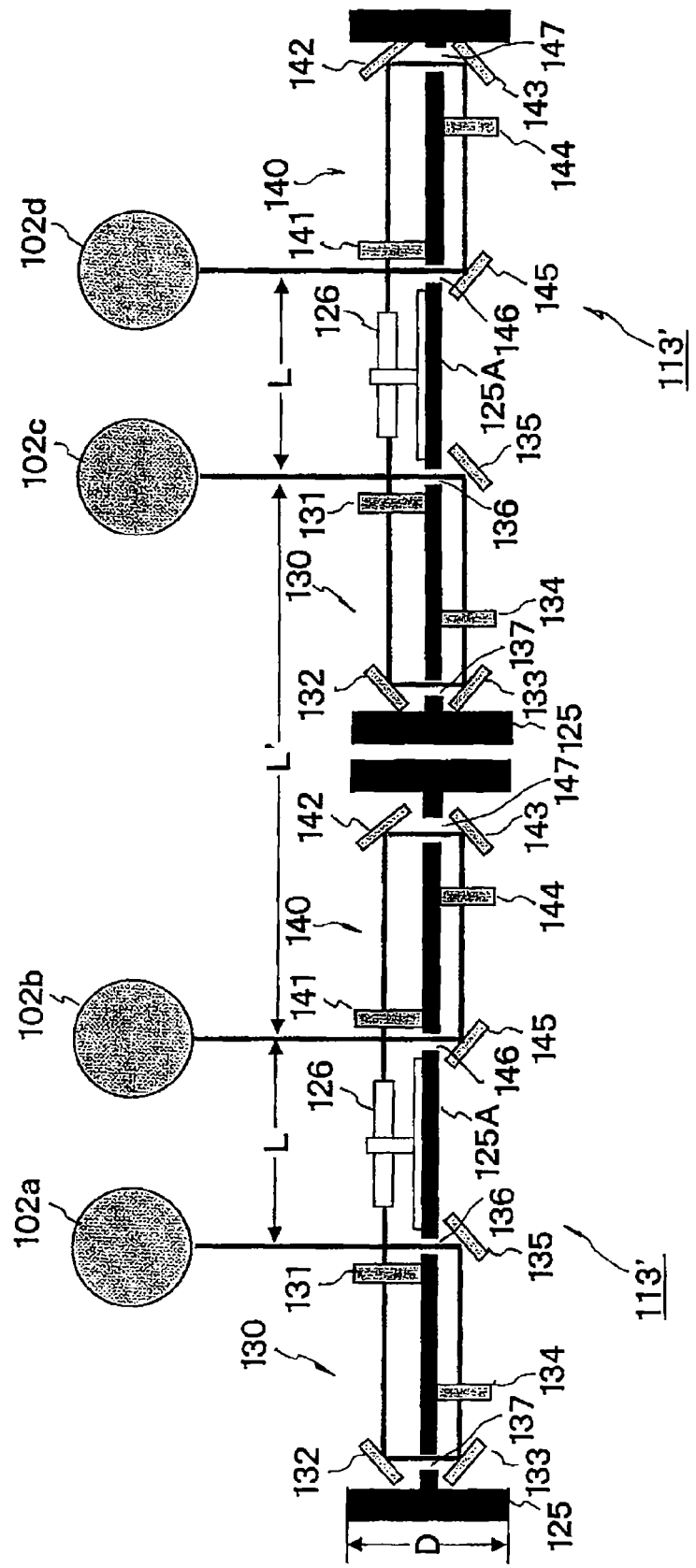
FIG. 8 is a sectional view of the main scanning of two optical scanning apparatuses according to a reference example.

As shown in FIG. 8, when the first openings 136, 146 are formed between the polygon mirror 126 and the first imaging lenses 131, 141, the return optical path of the second reflective mirrors 133, 143 and the third reflective mirrors 135, 145 can be lengthened. However generally, it is often the case that the first imaging lens 131, 141 is disposed in proximity to the polygon mirror 126, and consequently in this configuration, the pitch L between the photosensitive drums 102a and 102b and between 102c and 102d in each optical scanning apparatus 113' is reduced. For that reason, when both optical scanning apparatuses 113' are aligned in the conveying direction of the sheet as shown in the figure, the pitch L' between the photosensitive drums 102b and 102c increases relative to the pitch L, and therefore equalization of the pitches L, L' between the four colors photosensitive drums 102a-102d becomes difficult.

Figure 9:
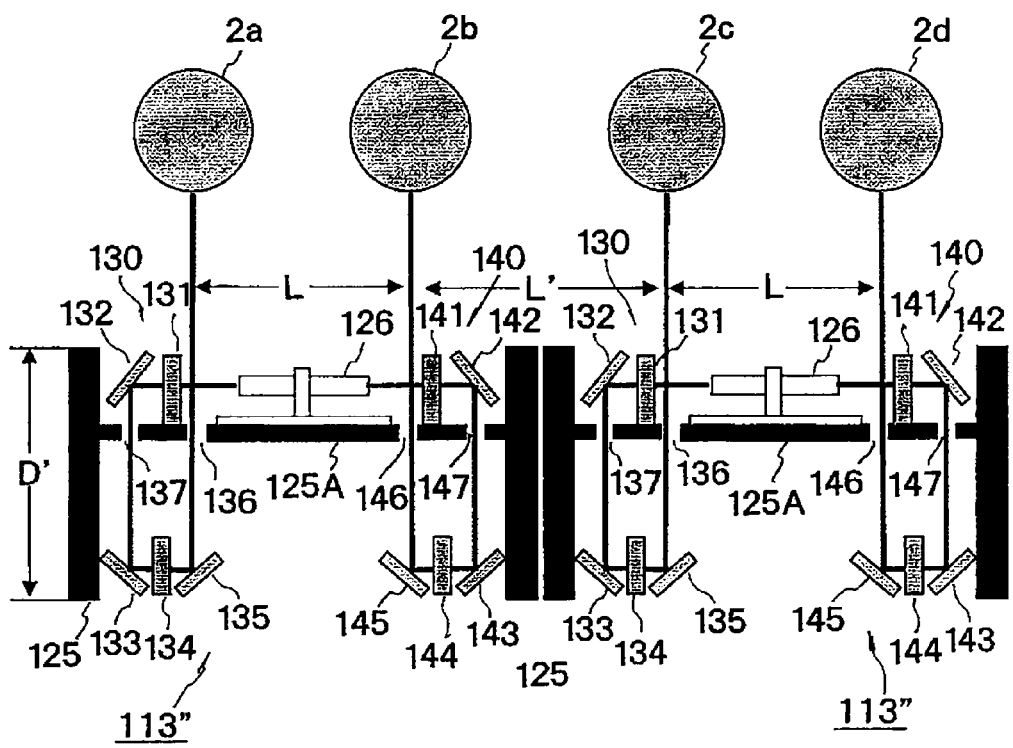
FIG. 9 is a sectional view of the main scanning of two optical scanning apparatuses according to a reference example.

The pitch L' between the four colors photosensitive drums 102b-102c may be reduced in order to equalize the pitches L, L' between the four photosensitive drums 102a-102d. However the configuration shown in FIG. 9 must be adopted in order to reduce the pitch L' between the photosensitive drums 102b-102c. However the problem arises that this configuration enlarges the housing 125 since the width D' in a height direction of the housing 125 of each optical scanning apparatus 113" becomes greater than the width D of the optical scanning apparatuses 113, 113' shown in FIG. 7 and FIG. 8.

Although the embodiments of the present invention have been described above making reference to the attached figures, the present invention is not limited to the embodiments. The shape of each constituent member shown in the above embodiments and the combination thereof is merely exemplary, and various modifications are possible based on design requirements within a scope that does not depart from the spirit of the present invention.

For example, in the embodiments above, a configuration in which a laser scanning unit 73 that is an example of the optical scanning apparatus according to the present invention is mounted a copying machine that is a single image forming apparatus. However the optical scanning apparatus according to the present invention is not limited to this configuration and may be mounted on devices such as measurement apparatuses, inspection apparatuses or the like in addition to an image forming apparatus such as a copying machine.

What is claimed is:

1. An optical scanning apparatus comprising an optical beam emission unit that emits an optical beam, a light guiding unit that guides the optical beam, a deflection unit that deflects the optical beam, and a chamber-shaped housing that accommodates the optical beam emission unit, the light guiding unit, and the deflection unit, wherein the housing comprises a base portion for installation of the optical beam emission unit, the light guiding unit, and the deflection unit, and cover portions, each cover portion including a respective indented heat emission channel that transmits heat inside the housing to a fluid therein, and wherein the heat emission channels are disposed to extend along the same direction, and fluid moving devices cause the fluid in one heat emission channel to flow in an opposite direction to the fluid in the other heat emission channel.

2. The optical scanning apparatus according to claim 1 comprising a heat transmission unit that is provided in the heat emission channel and transmits heat from the deflection unit to the heat emission channel.

3. The optical scanning apparatus according to claim 1 comprising a plurality of optical components that extend in the same direction as the light guiding unit, and the heat emission channel extends in the same direction as the direction of extension of the optical components.

4. The optical scanning apparatus according to claim 1 wherein the deflection unit comprises a polygon motor and a polygon mirror that deflects the optical beams emitted from the two optical beam emission units and are disposed in the center of the base portion, respective cover portions are disposed on the top and the bottom of the base portion to thereby enable formation of a heat emission channel on the top and the bottom of the deflection unit.

5. The optical scanning apparatus according to claim 4 wherein the inner portion of the housing is separated by the heat emission channel into a region in which optical beams emitted from one of the optical beam emission units are guided and a region in which the optical beams emitted from the other optical beam emission unit are guided.

6. An image forming apparatus including an optical scanning apparatus that emits optical beams and scans, a photosensitive member on which an electrostatic latent image is formed by illumination with the optical beams, and a developing device that forms a toner image by developing the electrostatic image, and is provided with the optical scanning apparatus according to claim 4 as an optical scanning apparatus.

7. An optical scanning apparatus that accommodates a scanning optical system in a housing, the scanning optical system includes a deflection device that deflects the optical beams emitted from a light source, an imaging lens that converts the optical beams deflected by the deflection device to constant-speed scanning light, and a first, second and third reflective mirror returning the constant-speed scanning light and guiding the light to the photosensitive member, the housing of the optical scanning apparatus forms a base plate that partitions the housing into an upper and a lower portion, the deflection device, and the first reflective mirror and the imaging lens of the scanning optical system are disposed on one surface of the base plate along the direction of propagation of the optical beams, the second and third reflective mirrors of the scanning optical system are disposed on the other surface of the base plate along the direction of propagation of the optical beams, a first opening is formed between the imaging lens and the first reflective mirror on an optical path connecting the photosensitive member with the third reflective mirror on the base plate, and a second opening is formed on the optical path connecting the first reflective mirror with the second reflective mirror on the base plate.

8. The optical scanning apparatus according to claim 7 wherein two scanning optical systems are disposed symmetrically about the deflection device.

9. A color image forming apparatus wherein two optical scanning apparatuses according to claim 8 are disposed in parallel with respect to the direction of conveying of the sheet.

* * * * *